United States Patent [19]

Toma et al.

[11] Patent Number: 4,828,936

[45] Date of Patent: May 9, 1989

[54] ALUMINUM ALLOY SHEET EXCELLENT IN HIGH-TEMPERATURE SAGGING RESISTANCE AND SACRIFICIAL ANODE PROPERTY AND HAVING HIGH ROOM-TEMPERATURE STRENGTH

[75] Inventors: Ken Toma, Mishima; Masami Asano, Susono; Noriaki Takahashi, Susono; Shoji Takeuchi, Susono; Yo Takeuchi, Susono, all of Japan

[73] Assignee: Mitsubishi Aluminum Kabushiki Kaisha, Tokyo, Japan

[21] Appl. No.: 59,958

[22] Filed: Jun. 9, 1987

[51] Int. Cl.$^4$ ............................................. B32B 15/00
[52] U.S. Cl. .................................. 428/650; 148/438; 148/439; 148/440; 428/654
[58] Field of Search .............. 420/528, 531, 532, 541; 148/415–417, 437, 438, 439, 440; 428/650, 654

[56] References Cited

U.S. PATENT DOCUMENTS 4,511,632  4/1985  Toma et al. ..................... 428/654

FOREIGN PATENT DOCUMENTS 57-169054  10/1982  Japan .
58-64339    4/1983  Japan .
59-85837    5/1984  Japan .
60-33346    2/1985  Japan .

*Primary Examiner*—R. Dean
*Attorney, Agent, or Firm*—Frishauf, Holtz, Goodman & Woodward

[57] ABSTRACT

An aluminum alloy sheet as a fin material for tubes of a heat exchanger, excellent in high-temperature sagging resistance and sacrificial anode property and having a high room-temperature strength, which consists essentially of:

Manganese: from 0.95 to 1.50 wt. %,
silicon: from 0.5 to 1.2 wt. %,
zinc: from 0.1 to 2.0 wt. %,
at least one element selected from the group consisting of:
  copper: from 0.05 to 0.60 wt. %, and
  magnesium: from 0.05 to 0.60 wt. %, where, the total amount of said copper and said magnesium being up to 1.0 wt. %, and
the balance being aluminum and incidental impurities.

The above-mentioned aluminum alloy sheet may further additionally contain at least one element selected from the group consisting of:
chromium: from 0.03 to 0.30 wt. %, and
zirconium: from 0.03 to 0.15 wt. % where, the total amount of said chromium and said zirconium being up to 0.4 wt. %.

8 Claims, No Drawings

ALUMINUM ALLOY SHEET EXCELLENT IN HIGH-TEMPERATURE SAGGING RESISTANCE AND SACRIFICIAL ANODE PROPERTY AND HAVING HIGH ROOM-TEMPERATURE STRENGTH

REFERENCE TO PATENTS, APPLICATIONS AND PUBLICATIONS PERTINENT TO THE INVENTION

So far as we know, there are available the following prior art documents pertinent to the present invention:
(1) Japanese Patent Provisional Publication No. 57-169,054 dated Oct. 18, 1982;
(2) Japanese Patent Provisional Publication No. 58-64,339 dated Apr. 16, 1983;
(3) Japanese Patent Provisional Publication No. 59-85,837 dated May 17, 1984;
(4) Japanese Patent Provisional Publication No. 60-33,346 dated Feb. 20, 1985; and
(5) U.S. Pat. No. 4,511,632 dated Apr. 16, 1985.

The contents disclosed in the above-mentioned prior art documents will be discussed hereafter under the heading of the "BACKGROUND OF THE INVENTION".

FIELD OF THE INVENTION

The present invention relates to an aluminum alloy sheet, which is adapted to be used as a fin material for tubes of a heat exchanger, excellent in high-temperature sagging resistance and sacrificial anode property and having a high room-temperature strength.

BACKGROUND OF THE INVENTION

A plurality of fins made of a thin metal sheet are provided on outer surfaces of tubes which are members constituting a heat exchanger such as a radiator for an automobile or a motorcycle, a condenser or an evaporator for a cooler; in order to increase a radiating surface area of the tubes. An aluminum alloy sheet is used in many cases as the material for the above-mentioned tubes because of the light weight and excellent thermal conductivity and corrosion resistance, and in such a case, it is the usual practice to use, as a fin material, a thin Al-Mn aluminum alloy sheet, or a thin Al-Mn alloy clad sheet which is manufactured by applying a film of a brazing metal comprising an Al-Si aluminum alloy onto at least one surface of a thin Al-Mn aluminum alloy sheet as a substrate sheet.

Various methods are available for installing fins made of any of the above-mentioned aluminum alloy sheets on the outer surface of a tube made of an aluminum alloy sheet. Among such various methods, there is widely adopted in the industry a brazing method for brazing at a time many joints between the outer surface of a tube and a plurality of fins, which comprises: provisionally tacking a plurality of fins substantially vertically at prescribed intervals onto the outer surface of a tube by means of an appropriate jig to form an assembly, the outer surface of said tube or at least one surface of each of said plurality of fins being previously applied with a brazing metal film; heating the thus formed assembly to a temperature of from about 580° to about 620° C. in a vacuum furnace or in a furnace filled with an inert gas, or heating the thus formed assembly, many joints of which are covered with a flux, to a temperature of from about 580° to about 620° C. in a furnace filled with air or an inert gas, to melt said brazing metal film; thereby brazing said plurality of fins to the outer surface of said tube with said melted brazing metal at a time by a single heating.

When installing the plurality of fins onto the outer surface of the tube by the above-mentioned method, the following problems are caused: the structure of the aluminum alloy sheet forming the fins is changed under the effect of the heating for brazing, and fine recrystallization grains are produced in the structure of the aluminum alloy sheet. Therefore, when the fins are made of the above-mentioned aluminum alloy clad sheet, the brazing metal melted by the above-mentioned heating penetrates into the gaps among the fine recrystallization grains of the aluminum alloy sheet as the substrate sheet, resulting in a decrease in high-temperature sagging resistance of the fins and, as a result, the fins sag down and deform under the effect of their own weight and cannot hold their original shape upon forming the assembly.

There have been proposed the following aluminum alloy sheets, which are adapted to be used as a fin material for tubes of a heat exchanger, in order to solve the above-mentioned problems:

(1) An aluminum alloy as a fin material, as disclosed in Japanese Patent Provisional Publication No. 57-169,054 dated Oct. 18, 1982, which consists essentially of:
manganese: from 0.9 to 1.5 wt.%,
silicon: from 0.2 to 1.5 wt.%,
chromium: from 0.05 to 0.40 wt.%,
zirconium: from 0.02 to 0.20 wt.%, and
the balance being aluminum and incidental impurities. (hereinafter referred to as the "prior art 1").

(2) An aluminum alloy as a fin material, as disclosed in Japanese Patent Provisional Publication No. 58-64,339 dated Apr. 16, 1983, which consists essentially of:
silicon: from 0.1 to 0.9 wt.%,
zinc: from 0.1 to 2.0 wt.%,
zirconium: from 0.02 to 0.20 wt.%, and
the balance being aluminum and incidental impurities.

The above-mentioned aluminum alloy may also additionally contain manganese within the range of from 0.1 to 0.9 wt.% and at least one element selected from the group consisting of:
copper: from 0.05 to 0.50 wt.%,
magnesium: from 0.1 to 0.7 wt.%, and
chromium: from 0.05 to 0.30 wt.%.
(hereinafter referred to as the "prior art 2").

(3) An aluminum alloy as a fin material, as disclosed in Japanese Patent Provisional Publication No. 59-85,837 dated May 17, 1984, which consists essentially of:
manganese: from 1.0 to 1.5 wt.%,
silicon: from 0.3 to 0.9 wt.%,
zirconium: from 0.02 to 0.20 wt.%,
at least one element selected from the group consisting of:
  copper: from 0.05 to 0.50 wt.%, and
  magnesium: from 0.05 to 0.50 wt.%,
at least one element selected from the group consisting of:
  nickel: from 0.05 to 0.30 wt.%, and
  iron: from 0.2 to 0.7 wt.%, and
the balance being aluminum and incidental impurities.

The above-mentioned aluminum alloy may also additionally contain chromium within the range of from 0.05 to 0.30 wt.%.
(hereinafter referred to as the "prior art 3")

(4) A method for manufacturing a fin material from an aluminum alloy, as disclosed in Japanese Patent Provisional Publication No. 60-33,346 dated Feb. 20, 1985, wherein said aluminum alloy consists essentially of:
manganese: from 0.5 to 2.0 wt.%,
silicon: from 0.1 to 1.0 wt.%, and
the balance being aluminum and incidental impurities.

The above-mentioned aluminum alloy may also additionally contain zirconium within the range of from 0.01 to 0.20 wt.% and/or at least one element selected from the group consisting of:
zinc: from 0.2 to 2.0 wt.%,
tin: from 0.002 to 0.100 wt.%, and
indium: from 0.002 to 0.100 wt.%.
(hereinafter referred to as the "prior art 4").

(5) An aluminum alloy clad sheet as a fin material, as disclosed in the U.S. Pat. No. 4,511,632 dated Apr. 16, 1985, which consists essentially of:
manganese: from 0.1 to 0.5 wt.%,
silicon: from 0.1 to 0.8 wt.%,
zirconium: from 0.02 to 0.20 wt.%, and
the balance being aluminum and incidental impurities.

The above-mentioned aluminum alloy clad sheet may also additionally contain chromium within the range of from 0.05 to 0.40 wt.% and/or at least one element selected from the group consisting of:
copper: from 0.1 to 0.7 wt.%, and
magnesium: from 0.1 to 0.7 wt.%, where, the total amount of said copper and said magnesium being up to 1.0 wt.%.
(hereinafter referred to as the "prior art 5").

The above-mentioned prior art 1 has the following problems: the high manganese content and the absence of an element for improving sacrificial anode property make an electric potential of the fins noble, resulting in a deteriorated sacrificial anode property of the fins and acceleration of corrosion of the tube. In addition, the absence of an element for improving strength leads to a low room-temperature strength of the fins brazed onto the tube, and deformation of the fins may easily occur under the effect of a wind pressure during service, thus resulting in performance degradation of the heat exchanger. Particularly, because of the recent tendency toward decreasing the thickness of the fins with a view to achieving a smaller weight of the heat exchangers, the above-mentioned sagging down and deformation of the fins are more liable to occur.

The above-mentioned prior art 2 has the following problems: because of the low manganese content, room-temperature strength and high-temperature sagging resistance of the fins brazed onto the tube are both insufficient in spite of the presence of an element for improving strength, leading to easy occurrence of sagging down and deformation of the fins.

The above-mentioned prior art 3 has the following problems: the high manganese content and the absence of an element for improving sacrificial anode property make an electric potential of the fins noble, resulting in a deteriorated sacrificial anode property of the fins and acceleration of corrosion of the tube.

The above-mentioned prior art 4 has the following problems: the absence of an element for improving strength leads to a low room-temperature strength of the fins brazed onto the tube, and deformation of the fins may easily occur under the effect of a wind pressure during service.

The above-mentioned prior art 5 has the following problems: because of the low manganese content, room-temperature strength and high-temperature sagging resistance of the fins brazed onto the tube are both insufficient in spite of the presence of an element for improving strength, leading to easy occurrence of sagging down and deformation of the fins. In addition, the absence of an element for improving sacrificial anode property leads to an insufficient sacrificial anode property in spite of the low manganese content, and corrosion may sometimes occur in the tube.

Under such circumstances, there is a strong demand for the development of an aluminum alloy sheet, which is adapted to be used as a fin material for tubes of a heat exchanger, excellent in high-temperature sagging resistance and sacrificial anode property and having a high room-temperature strength, but an aluminum alloy sheet having such properties has not as yet been proposed.

SUMMARY OF THE INVENTION

An object of the present invention is therefore to provide an aluminum alloy sheet, which is adapted to be used as a fin material for tubes of a heat exchanger excellent in high-temperature sagging resistance and sacrificial anode property and having a high room-temperature strength.

In accordance with one of the features of the present invention, there is provided an aluminum alloy sheet as a fin material for a tube of a heat exchanger, excellent in high-temperature sagging resistance and sacrificial anode property and having a high room-temperature strength, which consists essentially of:
manganese: from 0.95 to 1.50 wt.%,
silicon: from 0.5 to 1.2 wt.%,
zinc: from 0.1 to 2.0 wt.%,
at least one element selected from the group consisting of:
  copper: from 0.05 to 0.60 wt.%, and
  magnesium: from 0.05 to 0.60 wt.%, where, the total amount of said copper and said magnesium being up to 1.0 wt.%, and
the balance being aluminum and incidental impurities.

The aluminum alloy of the present invention may also additionally contain at least one element selected from the group consisting of
chromium: from 0.03 to 0.30 wt.%, and
zirconium: from 0.03 to 0.15 wt.%, where, the total amount of said chromium and said zirconium being up to 0.4 wt.%.

DETAILED DESCRIPTION OF PREFERRED EMBODIMENTS

From the above-mentioned point of view, extensive studies were carried out with a view to developing an aluminum alloy sheet, which is adapted to be used as a fin material for a tube of a heat exchanger, excellent in high-temperature sagging resistance and sacrificial anode property and having a high room-temperature strength. As a result, the following findings were obtained:

(1) By limiting the manganese content within the range of from 0.95 to 1.50 wt.%, and further limiting the silicon content within the range of from 0.5 to 1.2 wt.%, it is possible to improve both of high-temperature sagging resistance and room-temperature strength of the aluminum alloy sheet.

(2) By adding zinc in an amount of from 0.1 to 2.0 wt.%, and further adding at least one of copper in an amount of from 0.05 to 0.60 wt.% and magnesium in an amount of from 0.05 to 0.60 wt.% so that the total amount of copper and magnesium is up to 1.0 wt.%, it is possible to improve sacrificial anode property of the aluminum alloy sheet, and together with the effect of the above-mentioned manganese and silicon, to further improve room-temperature strength of the aluminum alloy sheet.

The present invention was made on the basis of the above-mentioned findings, and the aluminum alloy sheet as a fin material of the present invention is characterized by consisting essentially of:
manganese: from 0.95 to 1.50 wt.%,
silicon: from 0.5 to 1.2 wt.%,
zinc: from 0.1 to 2.0 wt.%,
at least one element selected from the group consisting of:
copper: from 0.05 to 0.60 wt.%, and
magnesium: from 0.05 to 0.60 wt.%, where, the total amount of said copper and said magnesium being up to 1.0 wt.%, and
the balance being aluminum and incidental impurities.

The aluminum alloy sheet of the present invention may also additionally contain at least one element selected from the group consisting of:
chromium: from 0.03 to 0.30 wt.%, and
zirconium: from 0.03 to 0.15 wt.%, where, the total amount of said chromium and said zirconium being up to 0.4 wt.%.

Now, the reasons for limiting the range of the chemical composition of the aluminum alloy sheet as a fin material of the present invention, are given below:

(1) Manganese:

Manganese has a function of improving both of high-temperature sagging resistance and room-temperature strength of the fins brazed onto the tube, by producing fine particles of an Al-Mn-Si compound under coexistence of manganese with silicon described later and through uniform dispersion of the thus produced fine particles of the Al-Mn-Si compound into the matrix of an aluminum alloy. Uniform dipersion of the fine particles of the Al-Mn-Si compound into the matrix of the aluminum alloy causes flat coarsening of recrystallization grains of the aluminum alloy sheet. As a result, when the fins are made of an aluminum alloy clad sheet, a brazing metal melted by the heating for brazing hardly penetrates into gaps among the flatly coarsened recrystallization grains of the aluminum alloy sheet as the substrate sheet, thus exerting the effect of preventing high-temperature sagging resistance of the fins from decreasing. In addition, flat coarsening of the recrystallization grains slows down corrosion of the fins acting as a sacrificial anode.

However, with a manganese content of under 0.95 wt.%, a desired effect as described above cannot be obtained. With a manganese content of over 1.50 wt.%, on the other hand, no particular improvement is observed in the above-mentioned effect. Furthermore, a manganese content of over 1.50 wt.% leads to production of large crystallization grains of an Al-Mn compound in the aluminum alloy during casting thereof, thus resulting in a lower workability in the manufacture of the fins. In addition, there is a considerable increase in the content of manganese dissolved in aluminum, leading to a decreased thermal conductivity. This results in a deteriorated heat exchange property required as a fin material for tubes of a heat exchanger. The manganese content should therefore be limited within the range of from 0.95 to 1.50 wt.%, and more preferably, within the range of from 1.0 to 1.3 wt.%.

(2) Silicon:

Silicon has a function of improving both of high-temperature sagging resistance and room-temperature strength of the fins as described above, by producing the fine particles of the Al-Mn-Si compound under coexistence of silicon with the above-mentioned manganese, and of slowing down corrosion of the fins as a sacrificial anode. However, with a silicon content of under 0.5 wt.%, a desired effect as described above cannot be obtained. With a silicon content of over 1.2 wt.%, on the other hand, high-temperature sagging resistance of the fins is deteriorated. The silicon content should therefore be limited within the range of from 0.5 to 1.2 wt.%, and more preferably, within the range of from 0.8 to 1.1 wt.%. Since high-temperature sagging resistance of the fins tends to be deteriorated when the silicon content exceeds the manganese content, the silicon content should preferably be up to the manganese content.

(3) Zinc:

Zinc has a function of rendering the fins brazed onto the tube electrochemically less noble, and thus improving sacrificial anode property thereof. However, with a zinc content of under 0.1 wt.%, a desired effect as described above cannot be obtained. With a zinc content of over 2.0 wt.%, on the other hand, no particular improvement is observed in the above-mentioned effect. Furthermore, a zinc content of over 2.0 wt.% deteriorates high-temperature sagging resistance and workability of the fins. The zinc content should therefore be limited within the range of from 0.1 to 2.0 wt.%, and more preferably, within the range of from 0.3 to 1.5 wt.%.

(4) Copper and magnesium:

Copper and magnesium have a function of further improving room-temperature strength of the fins through dissolution into the matrix of an aluminum alloy, together with the effect of the above-mentioned Al-Mn-Si compound. Magnesium has additionally a function of further improving the above-mentioned effect of zinc of improving sacrificial anode property of the fins. However, with a copper content or a magnesium content of under 0.05 wt.%, a desired effect as described above cannot be obtained. On the other hand, when the copper content or the magnesium content is over 0.6 wt.%, or when the total amount of copper and magnesium is over 1.0 wt.%, the above-mentioned effect of the Al-Mn-Si compound of flatly coarsening the recrystallization grains is impaired, resulting in deterioration of high-temperature sagging resistance, thermal conductivity and workability of the fins. Therefore, when any one of copper or magnesium is singly added, the copper content or the magnesium content should be limited within the range of from 0.05 to 0.6 wt.%, and more preferably, within the range of from 0.1 to 0.5 wt.%, and when both of copper and magnesium are simultaneously added, the total amount of copper and magnesium should be limited up to 1.0 wt.%.

(5) Chromium:

Chromium has a function of further improving high-temperature sagging resistance of the fins, by producing an Al-Cr compound, and promoting the flatly coarsening of the recrystallization grains of the aluminum alloy sheet through coexistence of this Al-Cr compound with the above-mentioned Al-Mn-Si compound. Therefore, in the aluminum alloy sheet as a fin material of the present invention, chromium is additionally and selectively added as required. However, with a chromium content of under 0.03 wt.%, a desired effect as described above cannot be obtained. With a chromium content of over 0.30 wt.%, on the other hand, no particular improvement is observed in the above-mentioned effect. Furthermore, a chromium content of over 0.30 wt.% leads to easier production of large crystallization grains of Al-Cr compound, resulting in a lower workability of the fins. Therefore, the chromium content should be limited within the arrange of from 0.03 to 0.30 wt.%.

(6) Zirconium:

Zirconium has a function of further improving high-temperature sagging resistance of the fins, by producing an Al-Zr compound, and promoting the flatly coarsening of the recrystallization grains of the aluminum alloy sheet, as in the case of chromium, through coexistence of this Al-Zr compound with the above-mentioned Al-Cr compound and the above-mentioned Al-Mn-Si compound. Therefore, in the aluminum alloy sheet as a fin material of the present invention, zirconium is additionally and selectively added as required. However, with a zirconium content of under 0.03 wt.%, a desired effect as described above cannot be obtained. With a zirconium content of over 0.15 wt.%, on the other hand, no particular improvement is observed in the above-mentioned effect. Furthermore, a zirconium content of over 0.15 wt.% leads to easier production of large crystallization grains of Al-Zr compound, resulting in a lower workability of the fins. Therefore, the zirconium content should be limited within the range of from 0.03 to 0.15 wt.%.

The above-mentioned chromium and zirconium may be simultaneously added. However, with a total amount of chromium and zirconium of over 0.4 wt.%, large crystallization grains of the Al-Cr compound and the Al-Zr compound are easily produced, resulting in a lower workability of the fins. Therefore, when both of chromium and zirconium are simultaneously added, the total amount of chromium and zirconium should be limited up to 0.4 wt.%.

When installing at a time a plurality of fins made of the aluminum alloy sheet of the present invention on the outer surface of a tube made of an aluminum alloy sheet in accordance with the conventional brazing method, it is the usual practice to previously apply a brazing metal film onto the surface of the tube, or onto at least one surface of each of the plurality of fins. In the latter case, the plurality of fins are made from the aluminum alloy sheet of the present invention, at least one surface of which is applied with the brazing metal film.

Now, the aluminum alloy sheet as a fin material of the present invention is described in more detail with reference to examples and in comparison with aluminum alloy sheets as a fin material outside the scope of the present invention.

EXAMPLES

Samples of the aluminum alloy sheet as a fin material of the present invention (hereinafter referred to as the "samples of the invention") Nos. 1 to 9, having chemical compositions within the scope of the present invention as shown in Table 1, and samples for comparison of an aluminum alloy sheet as a fin material (hereinafter referred to as the "samples for comparison) Nos. 1 to 12, having chemical compositions, at least one element of which is outside the scope of the present invention as shown in Table 2, were prepared by the method as described below.

TABLE 1

| No. | Chemical composition (wt. %) | | | | | | | | Type of sample | High-temp. sagging resistance (mm) | Sacrificial anode property | | Room-temp. strength (Kg/mm$^2$) |
| | Mn | Si | Zn | Cu | Mg | Cr | Zr | Al | | | Pitting corrosion potential (mv) | Maximum depth of pitting corrosion (mm) | |
| --- | --- | --- | --- | --- | --- | --- | --- | --- | --- | --- | --- | --- | --- |
| Samples of the invention | | | | | | | | | | | | | |
| 1 | 0.95 | 0.65 | 0.30 | 0.21 | — | — | — | Bal. | Bare sheet | 0.5 | −780 | 0.12 | 15.1 |
| | | | | | | | | | Clad sheet | 1.6 | −770 | 0.12 | 15.0 |
| 2 | 1.08 | 0.95 | 0.90 | 0.41 | — | — | — | Bal. | Bare sheet | 0.4 | −820 | 0.08 | 19.2 |
| | | | | | | | | | Clad sheet | 1.4 | −810 | 0.08 | 18.9 |
| 3 | 1.29 | 1.15 | 1.51 | — | 0.35 | — | — | Bal. | Bare sheet | 0.5 | −870 | 0.05 | 18.5 |
| | | | | | | | | | Clad sheet | 1.5 | −860 | 0.05 | 18.3 |
| 4 | 1.10 | 0.97 | 0.92 | 0.15 | 0.14 | — | — | Bal. | Bare sheet | 0.5 | −850 | 0.06 | 17.5 |
| | | | | | | | | | Clad sheet | 1.3 | −840 | 0.06 | 17.4 |
| 5 | 1.08 | 0.92 | 0.90 | 0.51 | — | 0.24 | — | Bal. | Bare sheet | 0.3 | −820 | 0.08 | 19.5 |
| | | | | | | | | | Clad sheet | 1.2 | −810 | 0.09 | 19.4 |
| 6 | 1.11 | 0.91 | 1.01 | — | 0.37 | — | 0.10 | Bal. | Bare sheet | 0.3 | −865 | 0.05 | 17.2 |
| | | | | | | | | | Clad sheet | 1.2 | −855 | 0.05 | 17.3 |
| 7 | 1.37 | 0.80 | 1.51 | 0.05 | 0.25 | 0.21 | — | Bal. | Bare sheet | 0.3 | −875 | 0.04 | 17.6 |
| | | | | | | | | | Clad sheet | 1.1 | −860 | 0.05 | 17.7 |
| 8 | 1.38 | 0.85 | 1.50 | — | 0.15 | 0.15 | 0.08 | Bal. | Bare sheet | 0.3 | −875 | 0.04 | 17.5 |
| | | | | | | | | | Clad sheet | 1.0 | −870 | 0.04 | 17.6 |
| 9 | 1.05 | 1.01 | 1.01 | 0.11 | 0.15 | 0.15 | 0.05 | Bal. | Bare sheet | 0.2 | −860 | 0.06 | 17.2 |
| | | | | | | | | | Clad sheet | 0.5 | −850 | 0.07 | 17.0 |

TABLE 2

| No. | Chemical composition (wt. %) | | | | | | | Al | Type of sample | High-temp. sagging resistance (mm) | Sacrificial anode property | | Room-temp. strength (Kg/mm$^2$) |
| --- | --- | --- | --- | --- | --- | --- | --- | --- | --- | --- | --- | --- | --- |
| | Mn | Si | Zn | Cu | Mg | Cr | Zr | | | | Pitting corrosion potential (mv) | Maximum depth of pitting corrosion (mm) | |
| Samples for comparison | | | | | | | | | | | | | |
| 1 | 1.07 | 0.88 | — | — | — | — | — | Bal. | Bare sheet | 0.5 | −740 | 0.45 | 14.5 |
| | | | | | | | | | Clad sheet | 1.7 | −735 | 0.48 | 14.6 |
| 2 | 1.05 | 0.89 | 0.98 | — | — | — | — | Bal. | Bare sheet | 0.5 | −865 | 0.05 | 14.4 |
| | | | | | | | | | Clad sheet | 1.8 | −855 | 0.05 | 14.4 |
| 3 | 1.08 | 0.85 | — | 0.39 | 0.35 | — | — | Bal. | Bare sheet | 0.5 | −715 | 0.52 | 19.5 |
| | | | | | | | | | Clad sheet | 1.6 | −705 | 0.54 | 19.0 |
| 4 | 0.78 | 0.92 | 0.98 | 0.41 | — | — | — | Bal. | Bare sheet | 1.0 | −820 | 0.08 | 14.3 |
| | | | | | | | | | Clad sheet | 2.0 | −810 | 0.09 | 13.8 |
| 5 | 1.70 | 0.88 | 0.95 | 0.39 | — | — | — | Bal. | Bare sheet | 0.4 | −800 | 0.10 | 21.5 |
| | | | | | | | | | Clad sheet | 1.3 | −795 | 0.11 | 20.8 |
| 6 | 1.05 | 0.36 | 0.96 | — | 0.37 | — | — | Bal. | Bare sheet | 1.0 | −865 | 0.05 | 14.2 |
| | | | | | | | | | Clad sheet | 3.5 | −855 | 0.05 | 14.0 |
| 7 | 1.04 | 1.45 | 0.91 | — | 0.35 | — | — | Bal. | Bare sheet | 2.7 | −860 | 0.05 | 18.4 |
| | | | | | | | | | Clad sheet | 25.4 | −855 | 0.05 | 18.5 |
| 8 | 1.05 | 0.88 | 0.04 | 0.40 | — | 0.12 | — | Bal. | Bare sheet | 0.3 | −715 | 0.55 | 19.1 |
| | | | | | | | | | Clad sheet | 1.2 | −710 | 0.58 | 19.0 |
| 9 | 1.02 | 0.91 | 3.00 | 0.41 | — | 0.13 | — | Bal. | Bare sheet | 1.5 | −890 | 0.04 | 19.4 |
| | | | | | | | | | Clad sheet | 20.2 | −880 | 0.04 | 19.3 |
| 10 | 1.01 | 0.90 | 0.99 | — | 0.02 | — | 0.11 | Bal. | Bare sheet | 0.3 | −865 | 0.06 | 14.1 |
| | | | | | | | | | Clad sheet | 1.4 | −855 | 0.06 | 14.0 |
| 11 | 1.04 | 0.90 | 1.02 | — | 0.81 | — | 0.12 | Bal. | Bare sheet | 0.4 | −870 | 0.05 | 19.1 |
| | | | | | | | | | Clad sheet | 5.5 | −865 | 0.05 | 19.2 |
| 12 | 1.04 | 0.88 | 1.00 | 0.60 | 0.60 | — | — | Bal. | Bare sheet | 0.4 | −825 | 0.08 | 20.5 |
| | | | | | | | | | Clad sheet | 6.7 | −815 | 0.09 | 20.0 |

Aluminum alloy slabs each having dimensions of 500 mm33 200 mm×50 mm and having the chemical composition as shown in Table 1 for preparing the samples of the invention Nos. 1 to 9, and aluminum alloy slabs each having the same dimensions as mentioned above and having the chemical composition as shown in Table 2 for preparing the samples for comparison Nos. 1 to 12, were cast by the conventional melting and casting method. Each of the thus cast slabs was subjected to a homogenizing treatment by holding it at a temperature of 595° C. for 24 hours, and then, the both surfaces of each of the cast slabs was ground by 5 mm through a mechanical surface grinding. Each of the thus ground slabs was hot-rolled to obtain a hot-rolled aluminum alloy sheet having a thickness of 8 mm. The thus obtained hot-rolled sheet was cold-rolled to a thickness of 2 mm through a primary cold rolling, and the thus obtained cold-rolled sheet was subjected to a primary annealing by holding at a temperature of 370° C. for two hours. Then, the cold-rolled sheet thus annealed was cold-rolled to a thickness of 0.23 mm through a secondary cold rolling, and the thus obtained cold-rolled sheet was subjected to a secondary annealing under the same conditions as in the above-mentioned primary annealing. Then the cold-rolled sheet thus annealed was cold-rolled to a thickness of 0.16 mm through a final cold rolling at a reduction ratio of 30%. Thus, the samples of the invention Nos. 1 to 9 and the samples for comparison Nos. 1 to 12 each having a thickness of 0.16 mm, were prepared. The type of the thus prepared samples of the invention Nos. 1 to 9 and samples for comparison Nos. 1 to 12, is hereinafter referred to as the "bare sheet type".

On the other hand, an Al-Si aluminum alloy sheet having a thickness of 1 mm and having the chemical composition shown in Table 3, which is set forth in the AA standard (the Standard of the Aluminum Association) 4343, was prepared as a brazing metal.

TABLE 3

| Si | Fe | Mn | Cu | Balance |
| --- | --- | --- | --- | --- |
| 7.8 | 0.34 | 0.01 | 0.02 | Aluminum and incidental impurities |

The above-mentioned Al-Si aluminum alloy sheet as the brazing metal having a thickness of 1 mm was laid on the both surfaces of each of the hot-rolled sheets having a thickness of 8 mm prepared as described above to form an assembly, and the assembly thus made was provisionally tacked by spot-welding the four corners thereof, and then cold-rolled by the same method as described above. Thus, the samples of the invention Nos. 1 to 9 and the samples for comparison Nos. 1 to 12, each having a thickness of 0.16 mm and each having a brazing metal film applied onto each of the both surfaces thereof, were prepared. The type of the thus prepared samples of the invention Nos. 1 to 9 and the samples for comparison Nos. 1 to 12, is hereinafter referred to as the "clad sheet type".

Subsequently, high-temperature sagging resistance, sacrificial anode property and room-temperature strength were tested by means of the following methods for each of the samples of the invention Nos. 1 to 9 and the samples for comparison Nos. 1 to 12, classifying them into the bare sheet type and the clad sheet type. The test results are shown also in Tables 1 and 2.

(1) High-temperature sagging resistance:

Test pieces each having a length of 140 mm and a width of 30 mm were cut respectively from the samples of the invention Nos. 1 to 9 and the samples for comparison Nos. 1 to 12 of the bare sheet type and the clad sheet type, which were prepared as described above.

Each of the test pieces was horizontally fixed onto a stand made of stainless steel so that a portion of 35 mm of the length of the test piece protruded from the end of the stand. Then, after heating the test piece at a temperature of 610° C. for five minutes, a downward sag value of the test piece was measured, and high-temperature sagging resistance was evaluated by means of the thus obtained downward sag value.

(2) Sacrificial anode property:

Sacrificial anode property was tested by measuring a value of a pitting corrosion potential and a value of a maximum depth of pitting corrosion by means of the following methods for each of the samples of the invention Nos. 1 to 9 and the samples for comparison Nos. 1 to 12 of the bare sheet type and the clad sheet type.

(a) Pitting corrosion potential:

The pitting corrosion potential was tested by measuring a value of the pitting corrosion potential in a salt water having a concentration of 3.5 wt.%, for each of the test pieces of the samples of the invention Nos. 1 to 9 and the samples for comparison Nos. 1 to 12 after having been subjected to the high-temperature sagging resistance test mentioned in (1) above. It is needless to mention that a lower pitting corrosion potential represents an electrochemically less noble status and a higher sacrificial anode property.

(b) Maximum depth of pitting corrosion:

Firstly, a plurality of fins having a prescribed shape were prepared from each of the samples of the invention Nos. 1 to 9 and the samples for comparison Nos. 1 to 12 of the bare sheet type and the clad sheet type.

In the case of the fins of the bare sheet type, an aluminum alloy tube, the outer surface of which was applied with a brazing metal film (hereinafter referred to as the "clad tube"), was used. The clad tube had a thickness of 0.4 mm and an elliptical cross-section with a longer axis of 16 mm and a shorter axis of 2.5 mm. The clad tube comprised a substrate tube made of an Al-Mn aluminum alloy having the chemical compostion shown in Table 4 below and set forth in the AA Standard 3003, and a brazing metal film having a thickness of 0.04 mm and having the chemical composition as set forth in the AA Standard 4343, which was applied onto the outer surface of the substrate tube. The above-mentioned plurality of fins of the bare sheet type were provisionally tacked substantially vertically at prescribed intervals onto the outer surface of the above-mentioned clad tube to form a test assembly.

TABLE 4

| Si | Fe | Cu | Mn | Balance |
|---|---|---|---|---|
| 0.15 | 0.33 | 0.15 | 1.1 | Aluminum and incidental impurities |

On the other hand, in the case of the fins of the clad sheet type, an aluminum alloy tube, the outer surface of which was not applied with a brazing metal film (hereinafter referred to as the "bare tube"), was used. The bare tube had the same dimensions and shape as those of the clad tube described above, and was made of an Al-Mn aluminum alloy having the chemical composition shown in Table 4 above and set forth in the AA Standard 3003. Each of the plurality of fins had, on each of the both surfaces thereof, a brazing metal film having the chemical composition as set forth in the AA Standard 4343. The above-mentioned plurality of fins of the clad sheet type were provisionally tacked substantially vertically at prescribed intervals onto the outer surface of the above-mentioned bare tube to form a test assembly.

Then, the joints of the above-mentioned test assembly were covered with a flux, and the test assembly was heated in a furnace at a temperature of 600° C. for five minutes to melt the brazing metal film to braze the plurality of fins onto the outer surface of the tube by means of the thus melted brazing metal at a time by a single heating, thus preparing a test tube having the plurality of fins installed on the outer surface thereof.

Subsequently, the test tube thus prepared was subjected, for the continuous period of 1,000 hours, to a corrosion test having a cycle of 120 minutes, which comprises: spraying a corroding solution comprising an artificial sea water and a glacial acetic acid with a pH value of from 2.8 to 3.0 and at a temperature of 50° C. onto the test tube for 30 minutes; then holding the test tube in an atmosphere at a humidity of 98% and a temperature of 50° C. for 90 minutes. The maximum depth of pitting corrosion produced on the outer surface of the test tube as a result of the above-mentioned corrosion test, was measured. The maximum depth of pitting corrosion was evaluated by means of the thus measured values.

(3) Room-temperature strength:

Test pieces each having a length of 200 mm and a width of 35 mm cut respectively from the samples of the invention Nos. 1 to 9 and the samples of comparison Nos. 1 to 12 of the bare sheet type and the clad sheet type, which were prepared as described above. Each of the test pieces was heated in a vacuum furnace at a temperature of 600° C. for five minutes, and then cooled to the room temperature. Subsequently, tensile strength at the room temperature was measured on each of the thus heated and cooled test pieces. Room-temperature strength was evaluated by means of the thus measured values.

As is clear from Tables 1 and 2, the sample for comparison No. 1 which contains neither zinc nor copper or magnesium shows a high pitting corrosion potential and a large maximum depth of pitting corrosion, resulting in a low sacrificial anode property and a low room-temperature strength. The sample for comparison No. 2 which contains neither copper nor magnesium has a low room-temperature strength. The sample for comparison No. 3 which does not contain zinc has a high pitting corrosion potential and a large maximum depth of pitting corrosion, resulting in a low sacrificial anode property. The sample for comparison No. 4 which the manganese content is low outside the scope of the present invention shows a poor high-temperature sagging resistance and a low room-temperature strength. The sample for comparison No. 5 of which the manganese content is high outside the scope of the present invention is poor in workability and thermal conductivity, although not shown in Table 2. The sample for comparison No. 6 of which the silicon content is low outside the scope of the present invention is low in high-temperature sagging resistance and room-temperature strength. The sample for comparison No. 7 of which the silicon content is high outside the scope of the present invention has a low high-temperature sagging resistance. The sample for comparison No. 8 of which the zinc content is low outside the scope of the present invention shows a high pitting corrosion potential and a large maximum depth of pitting corrosion, resulting in a poor sacrificial anode property. The sample for comparison No. 9 of which the zinc content is high outside the scope of the present invention has a low high-temperature sagging resistance, and a poor workability although not shown in Table 2. The sample for comparison No. 10 of which the magnesium content is low outside the scope of the present invention has a low room-temperature strength. And finally, both of the sample for comparison No. 11 of which the magnesium content is high outside the scope of the present invention and the sample for comparison No. 12 of which the copper and magnesium contents are high outside the scope of the present invention, show a poor high-temperature sagging resistance in the case of the clad sheet type, and are low in workability and thermal conductivity although not shown in Table 2.

All the samples of the invention Nos. 1 to 9 are in contrast excellent in high-temperature sagging resistance, and because of a low pitting corrosion potential and a small maximum depth of pitting corrosion, excellent in sacrificial anode property, have a high room-temperature strength, and show satisfactory workability and thermal conductivity although not shown in Table 1.

As described above in detail, the aluminum alloy sheet as a fin material of the present invention is excellent in high-temperature sagging resistance and sacrificial anode property, has a high room-temperature strength, and shows satisfactory workability and thermal conductivity, thus providing the following industrially useful effects:

(1) Since the aluminum alloy sheet as a fin material of the present invention is excellent in high-temperature sagging resistance, fins never sag down and deform under the effect of high temperatures during brazing, and thus irregularties in installation intervals of the fins never occur. Furthermore, because the aluminum alloy sheet as a fin material of the present invention has a high room-temperature strength, fins never deform under wind pressure during service. The resultant uniform and efficient cooling improve the performance of the heat exchanger, and in addition, the possibility of using thinner fins reduces the weight of the heat exchanger.

(2) The aluminum alloy sheet as a fin material of the present invention is excellent in sacrificial anode property. It is therefore possible to sufficiently prevent corrosion of a tube, thus extending the service life of the heat exchanger.

What is claimed is:

1. An aluminum alloy sheet as a fin material for a tube of a heat exchanger, having excellent high-temperature sagging resistance and sacrificial anode property and having high room-temperature strength, which consists essentially of:
   manganese: from 0.95 to 1.50 wt.%,
   silicon: from 0.5 to 1.2 wt.%,
   zinc: from 0.1 to 2.0 wt.%,
   at least on element selected from the group consisting of:
   copper: from 0.05 to 0.60 wt.%, and
   magnesium: from 0.05 to 0.60 wt.%, the total amount of said copper and said magnesium being up to 1.0 wt.%, and
   the balance being essentially aluminum,
   said aluminum alloy sheet being characterized by the presence of uniformly dispersed fine particles of Al-Mn-Si compound.

2. The aluminum alloy sheet as claimed in claim 1, wherein:
   said aluminum alloy sheet further additionally contains at least one element selected from the group consisting of:
   chromium: from 0.03 to 0.30 wt.%, and
   zirconium: from 0.03 to 0.15 wt.%, where, the total amount of said chromium and said zirconium being up to 0.4 wt.%.

3. The aluminum alloy sheet as claimed in claim 1, which consists essentially of:
   manganese: from 1.0 to 1.3 wt.%,
   silicon: from 0.8 to 1.1 wt.%,
   zinc: from 0.3 to 1.5 wt.%,
   at least one element selected from the group consisting of:
   copper: from 0.1 to 0.5 wt.%, and
   magnesium: from 0.1 to 0.5 wt.%, and
   the balance being essentially aluminum.

4. The aluminum alloy sheet as claimed in claim 3, wherein:
   said aluminum alloy sheet further additionally contains at least one element selected from the group consisting of:
   chromium: from 0.03 to 0.30 wt.%, and
   zirconium: from 0.03 to 0.15 wt.%, where, the total amount of said chromium and said zirconium being up to 0.4 wt.%.

5. The aluminum alloy sheet as claimed in claim 1 wherein:
   said aluminum alloy sheet has a brazing metal film applied onto at least one surface thereof.

6. The aluminum alloy sheet as claimed in claim 2, wherein:
   said aluminum alloy sheet has a brazing metal film applied onto at least one surface thereof.

7. The aluminum alloy sheet as claimed in claim 3, wherein:
   said aluminum alloy sheet has a brazing metal film applied onto at least one surface thereof.

8. The aluminum alloy sheet as claimed in claim 4, wherein:
   said aluminum alloy sheet has a brazing metal film applied onto at least one surface thereof.

* * * * *